(12) United States Patent
Nilsson et al.

(10) Patent No.: US 12,028,147 B2
(45) Date of Patent: Jul. 2, 2024

(54) METHOD AND NETWORK NODE FOR UPLINK BEAM MANAGEMENT

(71) Applicant: Telefonaktiebolaget LM Ericsson (publ), Stockholm (SE)

(72) Inventors: Andreas Nilsson, Gothenburg (SE); Fredrik Athley, Kullavik (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 147 days.

(21) Appl. No.: 17/776,712

(22) PCT Filed: Nov. 15, 2019

(86) PCT No.: PCT/SE2019/051165
§ 371 (c)(1),
(2) Date: May 13, 2022

(87) PCT Pub. No.: WO2021/096402
PCT Pub. Date: May 20, 2021

(65) Prior Publication Data
US 2022/0407584 A1    Dec. 22, 2022

(51) Int. Cl.
*H04B 7/08* (2006.01)
*H04B 17/318* (2015.01)

(52) U.S. Cl.
CPC ........... *H04B 7/088* (2013.01); *H04B 17/318* (2015.01)

(58) Field of Classification Search
CPC .............................. H04B 7/088; H04B 17/318
See application file for complete search history.

(56) References Cited

U.S. PATENT DOCUMENTS

| 2018/0199258 A1* | 7/2018 | Cezanne | ............... H04B 7/0695 |
| 2019/0021079 A1 | 1/2019 | Stirling-Gallacher et al. | |

(Continued)

FOREIGN PATENT DOCUMENTS

| WO | 2015/143898 A1 | 10/2015 |
| WO | 2018/128520 A1 | 7/2018 |

(Continued)

OTHER PUBLICATIONS

Spreadtrum Communications, "On CSI-RS using sub-time unit in beam management", R1-1707783, 3GPP TSG RAN WG1 meeting #89, Hangzhou, China, May 15-19, 2017 (8 pages).

(Continued)

*Primary Examiner* — Freshteh N Aghdam
(74) *Attorney, Agent, or Firm* — Rothwell, Figg, Ernst & Manbeck, P.C.

(57) ABSTRACT

A method for beam management, which method is performed by a network node. The method provides for using a first receive, RX, beam to receive a first signal transmitted by a user equipment, UE. The method then provides for obtaining, based on the first signal received using the first RX beam, a first received signal power value, P1. The method then provides for using a second RX beam to receive the first signal or another signal transmitted by the UE. The method then provides for obtaining, based on the signal received using the second RX beam, a second received signal power value, P2. The method then provides for determining whether P2 exceeds P1 by at least a threshold. The method then provides for determining whether to initiate a beam sweep based on whether or not P2 exceeds P1 by at least the threshold.

20 Claims, 10 Drawing Sheets

(56) References Cited

U.S. PATENT DOCUMENTS

| | | | |
|---|---|---|---|
| 2019/0074945 A1 | 3/2019 | Zhou et al. | |
| 2019/0261280 A1 | 8/2019 | Jung et al. | |
| 2019/0312619 A1* | 10/2019 | Abedini | H04B 7/0695 |
| 2019/0356439 A1 | 11/2019 | Lee et al. | |
| 2020/0028544 A1* | 1/2020 | Bengtsson | H04B 7/088 |
| 2020/0128488 A1* | 4/2020 | Zhou | H04L 5/0098 |
| 2020/0178280 A1* | 6/2020 | Guan | H04B 7/0626 |
| 2020/0336188 A1* | 10/2020 | Wang | H04B 7/0695 |
| 2021/0006986 A1* | 1/2021 | Zhu | H04B 7/088 |
| 2021/0231771 A1* | 7/2021 | Bengtsson | H04B 7/0695 |
| 2022/0255591 A1* | 8/2022 | Park | H04B 7/2681 |
| 2022/0345901 A1* | 10/2022 | Wang | H04W 72/02 |

FOREIGN PATENT DOCUMENTS

| | | |
|---|---|---|
| WO | 2018/144844 A1 | 8/2018 |
| WO | 2018/219435 A1 | 12/2018 |
| WO | 2020/164723 A1 | 8/2020 |

OTHER PUBLICATIONS

International Search Report and Written Opinion dated Oct. 9, 2020 in International Application No. PCT/SE2019/051165 (10 pages).

* cited by examiner

METHOD AND NETWORK NODE FOR UPLINK BEAM MANAGEMENT

CROSS REFERENCE TO RELATED APPLICATION(S)

This application is a 35 U.S.C. § 371 National Stage of International Patent Application No. PCT/SE2019/051165, filed Nov. 15, 2019.

TECHNICAL FIELD

Disclosed are embodiments related to beam management.

BACKGROUND

1. Beam Management

Narrow beam transmission and reception schemes are needed at higher frequencies to compensate for high propagation loss. A suitable transmission and reception point (TRP) transmit (TX) beam for each UE is expected to be discovered and monitored by the network (e.g., a base station) using measurements on downlink reference signals (RSs) used for beam management. Such downlink reference signals include Channel State Information RS (CSI-RS) and synchronization signal block (SSB). Beam management RSs can be transmitted periodically, semi-persistently, or aperiodically (event triggered), and they can be either shared between multiple UEs or be UE-specific. The SSB are transmitted periodically and are shared for all UEs. In order to find a suitable TRP TX beam, the TRP transmits CSI-RS/SSB using different TRP TX beams, and the UE performs reference signal received power (RSRP) measurements on the received reference signals and reports back the N best TRP TX beams and their corresponding RSRP values (where N can be configured by the network).

Typically, a base station makes use of three different beam management procedures. These three procedure are knows as: the P1 procedure, the P2 procedure, and the P3 procedure, and are illustrated in FIGS. 1A, 1B, and 1C, respectively. The P1, P2, and P3 procedures are also known as the P1 beam sweep, P2 beam sweep, and P3 beam sweep, respectively.

In the P1 procedure shown in FIG. 1A, a base station 102 uses TX beams having large beamwidths. Beam reference signals transmitted using the TX beams are transmitted periodically and are shared between multiple UEs (including UE 104). Examples of the periodic beam reference signals are periodic CSI-RS and SSB. After UE 104 receives the reference signals, UE 104 may report to base station 102 the N best TRP TX beams and their corresponding RSPR values. The beam reporting from UE 104 to base station 102 can be performed in a periodic manner, a semi-persistent manner, or in aperiodic manner. The P1 procedure may be used to find a coarse direction of a UE 104 with respect to base station 102.

After determining the coarse direction of UE 104, in the P2 procedure shown in FIG. 1B, base station 102 uses narrower TRP TX beams covering the area corresponding to the TRP TX beam selected as a result of performing the P1 procedure. In the P2 procedure, base station 102 may transmit reference signals in aperiodic or semi-persist manner. The P2 procedure may be performed more frequently than the P1 procedure to track UE 104's movements or changes in the radio environment. The P2 procedure may be used to select a suitable narrow TRP TX beam for use in communicating with UE 104.

More specifically, during the P2 beam sweep, UE 104 measures RSRP for each of the beams in the set of TRP beams 103 (using a fixed UE RX beam 101) and sending back to the base station 102 the CSI-RS resource index(s) (CRI(s)) corresponding to the highest RSRP(s), where each CRI corresponds to one of the TRP TX beams 103. During such P2 beam sweep it is expected that UE 104 will apply a wide beam 103 (a.k.a., a non-directional beam or omni-directional beam) (e.g. the widest beam that the UE is able to generate) so that as many propagation paths as possible between the base station 102 and the UE 104 are captured by the P2 beam sweep.

The P3 procedure is a procedure that enables UE 104 to select a "best" UE receive (RX) beam. For example, after finding a suitable narrow TRP TX beam as a result of performing a P2 beam sweep, in the P3 procedure shown in FIG. 1C, base station 102 transmits a burst of reference signals using one narrow beam 107 (e.g., the narrow TRP TX beam selected as a result of the P2 procedure) in aperiodic or semi-persistent manner. The UE 104 uses different receiving (RX) beams to receive signal(s) from base station 102 to find a suitable RX beam at UE 104. That is, UE 104 can sweep through different UE RX directional beams 105, perform measurements on the CSI-RS and select a preferred UE RX directional beam (e.g., UE RX beam 114). How the UE determine the candidate UE RX beams is up to UE implementation. The P3 procedure may be performed frequently to compensate for blocking and/or UE rotation.

Wide beams may be used in the P1 procedure described above to find a coarse direction of UE 104 with respect to base station 102. Narrow beams may be used in the P2 procedure to find a narrow TX beam that is suitable for data transmission to UE 104.

One way of selecting narrow beams in the P2 procedure is (1) determining which of the wide beams used in the P1 procedure performs the best in terms of RSRP values and (2) selecting narrow beams that are confined within the angular coverage of the determined wide beam. For example, in the exemplary P1 procedure shown in FIG. 1A, wide beam 109 was the best wide beam. Thus, in P2 procedure shown in FIG. 1B, the narrow beams confined within angular coverage of the wide beam 109 are selected.

2. Antenna Architectures

There are three different implementations of beamforming at a TRP—analog beamforming, digital beamforming, and hybrid beamforming. Digital beamforming is the most flexible solution among the three but costs the most due to a large number of required radios and baseband chains. Analog beamforming is cheaper to manufacture as compared to the digital beamforming due to a reduced number of radios and baseband chains. Analog beamforming is the least flexible solution among the three, but is cheaper to implement due to reduced number of radio and baseband chains. Another drawback of the analog beamforming is that a TRP can only transmit or receive in one beam at a time (assuming one panel, and the same beam for both polarizations, which typically is the case in order to counteract dropped signal strength due to polarization mis-matching). Hybrid beamforming is a compromise between the analog beamforming and digital beamforming. One type of beamforming antenna architecture that has been agreed to study in 3GPP for the NR access technology is the concept of antenna panels, both at the TRP and at the UE. A panel is an antenna array of single-polarized or dual-polarized antenna elements with typically one transmit/receive unit (TXRU) per polarization. An analog distribution network with phase shifters is used to steer the beam of each panel. Multiple panels can be stacked next to each other and digital beamforming can be performed across the panels. FIG. 2 illustrates an example with two panels where each panel is connected to one TXRU per polarization.

3. Uplink (UL) Beam Management

Some UEs have analog beamformers without beam correspondence; consequently, downlink/uplink reciprocity cannot be used to determine the beams for these beamformers. For such UEs, the UE beam used for uplink (UL) cannot be derived from beam management procedures based on downlink (DL) reference signals as described above. To handle such UEs, UL beam management has been included in the NR standard specification for release 15. The main difference between DL beam management and UL beam management is that UL beam management utilizes UL reference signals instead of DL references signals. The UL reference signals that have been agreed to be used for UL beam management is sounding reference signals (SRS). Two UL beam management procedures are supported in NR; U2 and U3, which are schematically illustrated in FIGS. 3A and 3B. The U2 procedure (a.k.a., U2 beam sweep), illustrated in FIG. 3A, is performed by transmitting a burst of SRS resources in one UE TX beam 310 and letting the base station 102 evaluate different TRP RX beams 312a, 312b, 312c, and 312d. The U3 procedure, illustrated in FIG. 3B, lets the UE 104 evaluate a suitable UE TX beam by transmitting different SRS resources in different UE TX beams 314a, 314b, 314c, and 314d, while base station 102 receives the SRS resources using a single TRP TX beam 316.

4. SRS Transmission Setting

How the SRS transmission should be performed by UE 104 is defined in a SRS-Config information element (IE), and is signaled to the UE 104 from the TRP with RRC signaling. As shown in Table 1 below, the SRS-Config 1E contains a list of SRS-Resources (the list constitutes a "pool" of resources). Each SRS resource contains information of the physical mapping of the reference signal on the time-frequency grid, time-domain information, and sequence IDs. The SRS-Config also contains a list of SRS resource sets, which contains a list of SRS resources and an associated Downlink Control Information (DCI) trigger state. Thus, when a certain DCI state is triggered, it indicates that the SRS resources in the associated set shall be transmitted by the UE.

Each SRS resource set can be associated with one usage, including, for example, beamManagement, codebook, non-Codebook, antennaSwitching.

SRS resources with usage 'codebook' are used to sound the different UE antennas and let the base station 102 determine suitable precoders, rank and modulation, and coding scheme (MCS) for coming UL transmission. How each SRS port is mapped to each UE antenna is up to UE implementation, but it is expected that one SRS port will be transmitted per UE antenna. For example, the SRS port to antenna port mapping can be an identity matrix.

SRS resources with usage 'nonCodebook' is used to sound different potential precoders by the UE 104. The UE 104 determines a set of candidate precoders based on reciprocity and transmits one SRS resource per candidate precoder. The base station 102 can then select which precoders the UE 104 should use for physical uplink shared channel (PUSCH) transmissions. One UL layer can be transmitted per indicated candidate precoder. How the UE 104 maps the SRS resources to the antenna ports is up to UE implementation and depends on the channel characteristics.

SRS resources with usage 'antennaSwitching' are used to sound the channel in UL so that the base station 102 uses reciprocity to determine suitable DL precoders. If the UE 104 has the same number of TX and RX chains, the UE 104 shall transmit one SRS port per UE antenna. UE implementation can select which SRS port is transmitted from which antenna.

SRS resources with usage 'beamManagement' are only applicable for higher frequencies (FR2) and are used to find a suitable beam at the UE 104, by transmitting different SRS resources in different UE TX beams. A repetition factor up to 4 can be defined per SRS resources, which allows the base station 102 to evaluate up to four different TRP RX beams. The SRS resource set with a repetition factor can be triggered multiple times in case the base station 102 would like to evaluate more than 4 TRP RX beams.

How SRS transmissions are configured and triggered for NR can be found below in Table 1, which is taken from the NR specification 3GPP TS 38.331 [Version 15.7.0]:

TABLE 1

2.1.1.1 SRS-Config
The SRS-Config Information Element (IE) is used to configure sounding reference signal transmissions. The configuration defines a list of SRS-Resources and a list of SRS-ResourceSets.
Each resource set defines a set of SRS-Resources. The network triggers the transmission of the set of SRS-Resources using a configured aperiodicSRS-ResourceTrigger (that is carried in physical layer downlink control information, 'L1 DCI').

SRS-Config information element

```
-- ASN1START
-- TAG-SRS-CONFIG-START
SRS-Config ::=                       SEQUENCE {
    srs-ResourceSetToReleaseList             SEQUENCE (SIZE(1..maxNrofSRS-ResourceSets))
OF SRS-ResourceSetId OptIONAL,              -- Need N
    srs-ResourceSetToAddModList              SEQUENCE (SIZE(1..maxNrofSRS-ResourceSets))
OF SRS-ResourceSet OptIONAL,                -- Need N
    srs-ResourceToReleaseList                SEQUENCE (SIZE(1..maxNrofSRS-Resources)) OF
SRS-ResourceId OptIONAL,                    -- Need N
    srs-ResourceToAddModList                 SEQUENCE (SIZE(1..maxNrofSRS-Resources)) OF SRS-
Resource OptIONAL,                          -- Need N
    tpc-Accumulation                         ENUMERATED {disabled}   OptIONAL,   -- Need S
    ...
}
SRS-ResourceSet ::=                  SEQUENCE {
    srs-ResourceSetId                        SRS-ResourceSetId,
    srs-ResourceIdList                       SEQUENCE (SIZE(1..maxNrofSRS-ResourcesPerSet)) OF
SRS-ResourceId             OPTIONAL,        -- Cond Setup
```

TABLE 1-continued

```
resourceType                         CHOICE {
  aperiodic                            SEQUENCE {
    aperiodicSRS-ResourceTrigger   INTEGER (1..maxNrofSRS-TriggerStates-1),
    csi-RS                             NZP-CSI-RS-ResourceId OptIONAL,   -- Cond NonCodebook
    slotOffset                         INTEGER (1..32) OptIONAL,    -- Need S
    ...,
    [[
    aperiodicSRS-ResourceTriggerList-v1530   SEQUENCE (SIZE(1..maxNrofSRS-
TriggerStates-2))
                              OF INTEGER (1..maxNrofSRS-TriggerStates-1) OptIONAL   -- Need M
    ]]
  },
  semi-persistent                      SEQUENCE {
    associatedCSI-RS                   NZP-CSI-RS-ResourceId OptIONAL,   -- Cond NonCodebook
    ...
  },
  periodic                           SEQUENCE {
    associatedCSI-RS                   NZP-CSI-RS-ResourceId OptIONAL,   -- Cond NonCodebook
    ...
  }
},
usage                              ENUMERATED {beamManagement, codebook, nonCodebook,
antennaSwitching},
alpha                              Alpha           OptIONAL, -- Need S
p0                                 INTEGER (-202..24)     OptIONAL, -- Cond Setup
pathlossReferenceRS                  CHOICE {
  ssb-Index                          SSB-Index,
  csi-RS-Index                       NZP-CSI-RS-ResourceId
}                                    OptIONAL, -- Need M
srs-PowerControlAdjustmentStates ENUMERATED { sameAsFci2,
separateClosedLoop} OptIONAL, -- Need S
...
}
SRS-ResourceSetId ::=                    INTEGER (0..maxNrofSRS-ResourceSets-1)
SRS-Resource ::=                     SEQUENCE {
  srs-ResourceId                     SRS-ResourceId,
  nrofSRS-Ports                      ENUMERATED {port1, ports2, ports4},
  ptrs-PortIndex                     ENUMERATED {n0, n1} OptIONAL,   -- Need R
  transmissionComb                   CHOICE {
    n2                SEQUENCE {
      combOffset-n2                  INTEGER (0..1),
      cyclicShift-n2                 INTEGER (0..7)
    },
    n4                SEQUENCE {
      combOffset-n4                  INTEGER (0..3),
      cyclicShift-n4                 INTEGER (0..11)
    }
  },
  resourceMapping                      SEQUENCE {
    startPosition                    INTEGER (0..5),
    nrofSymbols                    ENUMERATED {n1, n2, n4},
    repetitionFactor                 ENUMERATED {n1, n2, n4}
  },
  freqDomainPosition                   INTEGER (0..67),
  freqDomainShift                    INTEGER (0..268),
  freqHopping                        SEQUENCE {
    c-SRS                            INTEGER (0..63),
    b-SRS                            INTEGER (0..3),
    b-hop                            INTEGER (0..3)
  },
  groupOrSequenceHopping             ENUMERATED { neither, groupHopping,
sequenceHopping },
  resourceType                       CHOICE {
    aperiodic                          SEQUENCE {
      ...
    },
    semi-persistent                    SEQUENCE {
      periodicityAndOffset-sp              SRS-PeriodicityAndOffset,
      ...
    },
    periodic           SEQUENCE {
      periodicityAndOffset-p               SRS-PeriodicityAndOffset,
      ...
    }
  },
  sequenceId                         INTEGER (0..1023),
  spatialRelationInfo                  SRS-SpatialRelationInfo OptIONAL,   -- Need R
  ...
}
SRS-SpatialRelationInfo ::= SEQUENCE {
```

TABLE 1-continued

```
servingCellId            ServCellIndex OptIONAL,   -- Need S
referenceSignal              CHOICE {
  ssb-Index                  SSB-Index,
  csi-RS-Index               NZP-CSI-RS-ResourceId,
    srs                    SEQUENCE {
      resourceId             SRS-ResourceId,
      uplinkBWP              BWP-Id
    }
  }
}
}
SRS-ResourceId ::= INTEGER (0..maxNrofSRS-Resources-1)
SRS-PeriodicityAndOffset ::= CHOICE {
  sl1                    NULL,
  sl2                    INTEGER(0..1),
  sl4                    INTEGER(0..3),
  sl5                    INTEGER(0..4),
  sl8                    INTEGER(0..7),
  sl10                   INTEGER(0..9),
  sl16                   INTEGER(0..15),
  sl20                   INTEGER(0..19),
  sl32                   INTEGER(0..31),
  sl40                   INTEGER(0..39),
  sl64                   INTEGER(0..63),
  sl80                   INTEGER(0..79),
  sl160                  INTEGER(0..159),
  sl320                  INTEGER(0..319),
  sl640                  INTEGER(0..639),
  sl1280                 INTEGER(0..1279),
  sl2560                 INTEGER(0..2559)
}
-- TAG-SRS-CONFIG-STOP
-- ASN1STOP
```

SUMMARY

Certain challenges exist due to the fact that many user equipments (UEs) (e.g., cars, drones, smart phones, sensors, and other network-accessible communication devices) are simultaneously connected to the Internet via a base station. For base stations equipped with analog beamforming, each base station panel can only receive with one beam at a given time (hence in case a base station has two panels, the base station can receive with two beams, one per panel). An UL beam management sweep will therefore require exceptional overhead in order to account for the increasing number of UEs that are able to access the Internet via the base station. Since U2 and U3 beam sweeps are typically aperiodic, and not shared between multiple UEs, the overhead of beam management is expected to grow linearly with the increasing number of UEs in the cell. This will lead to an overhead cost that severely reduces the performance of the network, both with respect to capacity and latency. There is, therefore, a need to reduce the amount of overhead for UL beam management procedures.

In one embodiment, this reduction in overhead is achieved by having a base station trigger a UE to perform a single SRS resource transmission, while the base station receives the transmission using a wide TRP RX beam on a first TRP panel and a narrow TRP RX beam on a second TRP panel (e.g., the narrow beam is the currently-known best TRP RX beam, which has been found previously using for example an extensive beam management procedure). The base station then compares the difference in received power between the narrow beam and the wide beam (e.g., diff=RSRP_narrow_beam−RSRP_wide_beam). If "diff" is smaller than a certain threshold (and with a proper value of the threshold), there is a large chance that another narrow TRP RX beam is better than the current best narrow TRP RX beam, and the base station can then decide to initiate a U2 beam sweep. For example, initiating a U2 beam sweep comprises triggering an SRS resource set with repetition factor=N, where N is, for example, 4 or more (the SRS resource set could be triggered multiple times in case more than N TRP beams need to be evaluated).

In one embodiment, the TRP uses received data instead of a received SRS to determine the difference in RSRP between the current best narrow beam (generated on one panel) and the wide beam (generated on a second panel).

In one embodiment, the TRP only uses one of its panels, or, alternatively, the TRP is only equipped with one panel. In this case, the UE is triggered for transmission of two SRS resources, where the TRP uses a wide beam when receiving one of the SRS resources, and a narrow beam when receiving the other SRS resource (other limitations of this embodiment are as described above).

Accordingly, in one aspect there is provided a method for beam management. In one embodiment the method is performed by a network node and includes the network node using a first RX beam to receive a first signal (e.g., an SRS) transmitted by a user equipment, UE. The method also includes the network node obtaining, based on the first signal received using the first RX beam, a first received signal power value, P1 (e.g., an RSRP value). The method also includes the network node using a second RX beam to receive the first signal or another signal transmitted by the UE, wherein the first RX beam is wider than the second RX beam (in some embodiment the second RX beam is a previously determined best beam). The method also includes the network node obtaining, based on the signal received using the second RX beam, a second received signal power value, P2. The method also includes the network node determining whether P2 exceeds P1 by at least a threshold. And the method also includes the network node determining whether to initiate a beam sweep based on whether or not P2 exceeds P1 by at least the threshold.

In another aspect there is provided a network node that includes processing circuitry and a data storage system that store instructions executable by said processing circuitry, whereby said network node is operative to perform the above described method. In another aspect there is provided a computer program comprising instructions which when executed by processing circuitry causes the processing circuitry to perform any of the processes (methods) described herein. In one embodiment there is a carrier containing this computer program, wherein the carrier is one of an electronic signal, an optical signal, a radio signal, and a computer readable storage medium.

An advantage of the embodiments is that they reduce overhead because they reduce the likelihood that the base station will unnecessarily initiate a U2 beam sweep. That is, by enabling the base station to determine whether or not the currently selected narrow beam is performing as well as a narrow beam should, the base station can make a better decision about when to initiate a U2 beam sweep so that the base station will avoid initiating a U2 sweep when the current narrow beam is performing well enough.

BRIEF DESCRIPTION OF THE DRAWINGS

The accompanying drawings, which are incorporated herein and form part of the specification, illustrate various embodiments.

DETAILED DESCRIPTION

Figure 1A:
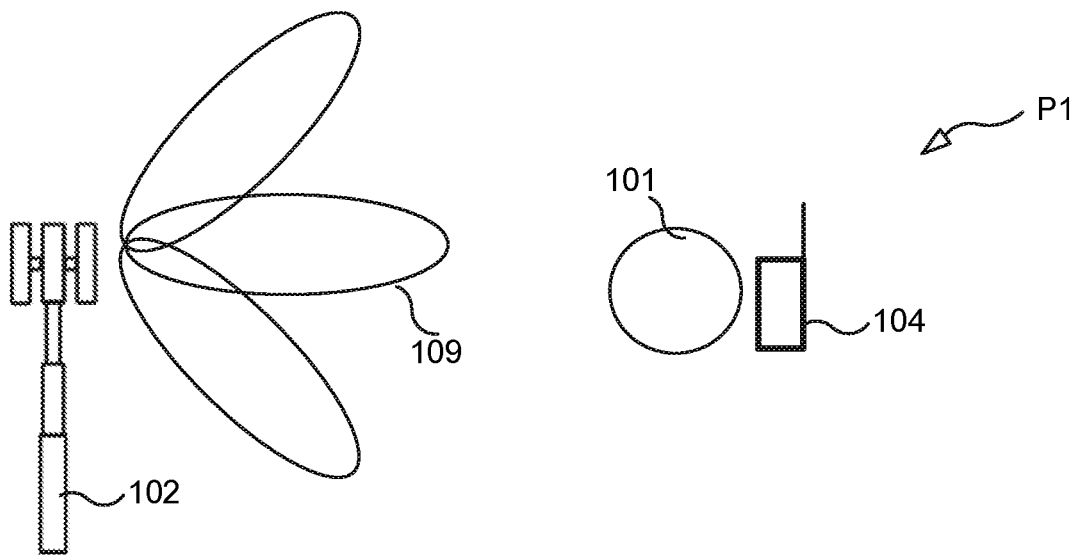
FIGS. 1A, 1B, and 1C illustrate P1, P2, and P3 beam sweeps, respectively.
Figure 1B:
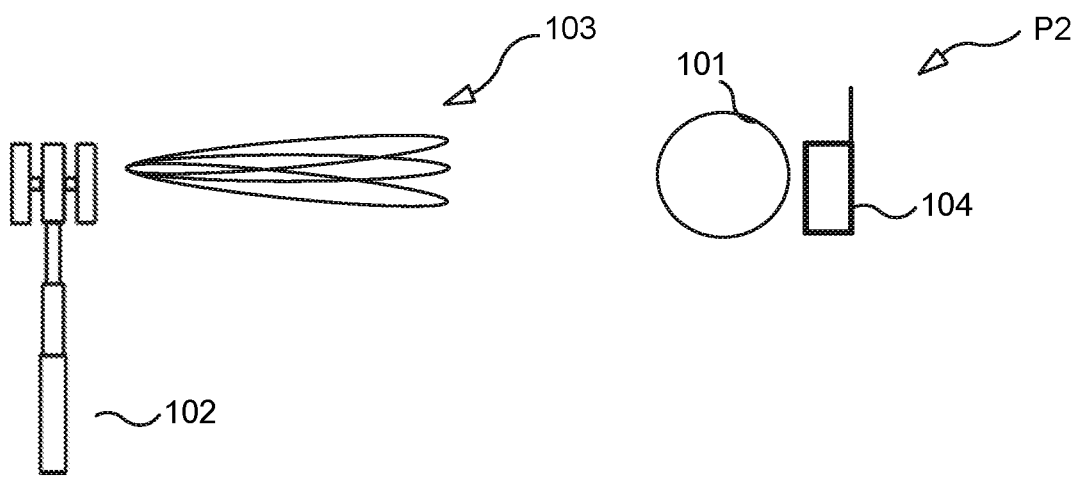
Figure 1C:
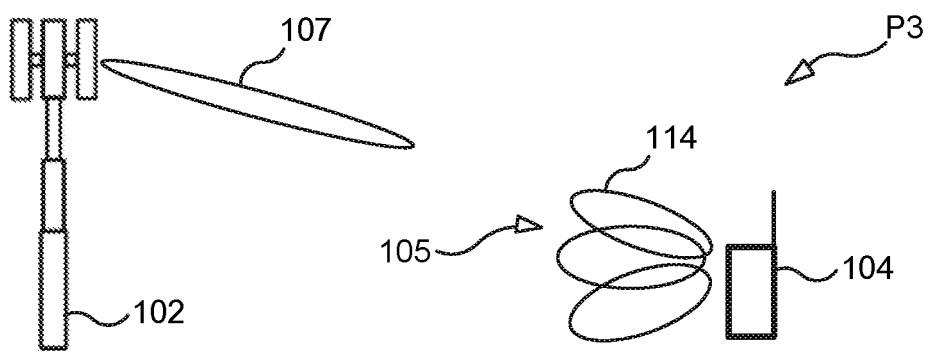
Figure 2:
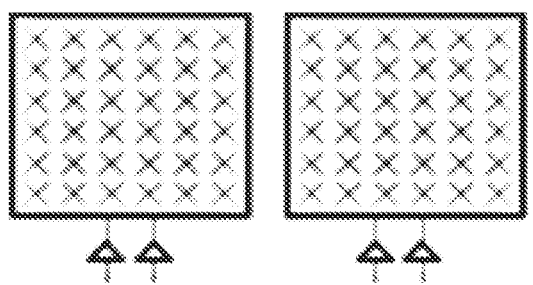
FIG. 2 illustrates two exemplary antenna panels, according to some embodiments.
Figure 3A:
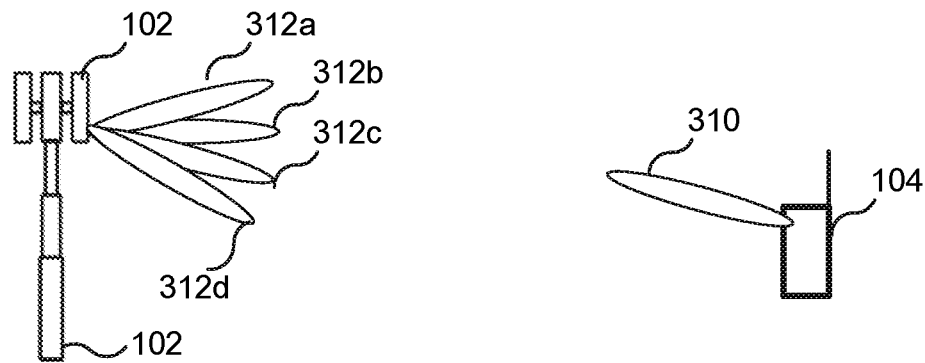
FIGS. 3A and 3B illustrate U2 and U3 UL beam management procedures, respectively.
Figure 3B:
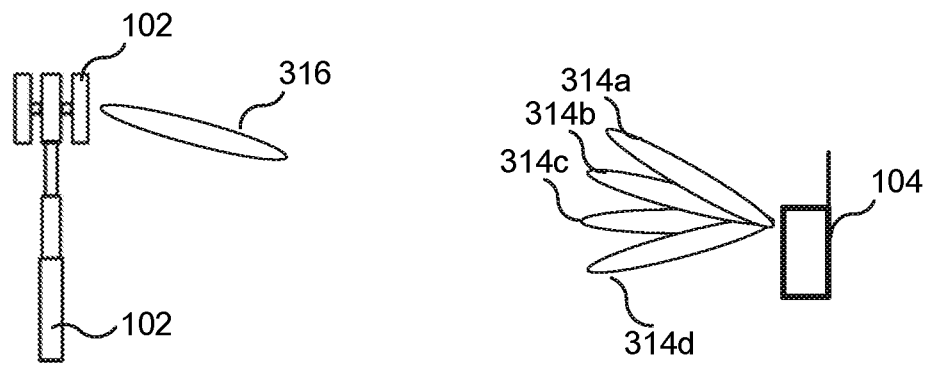
Figure 4:
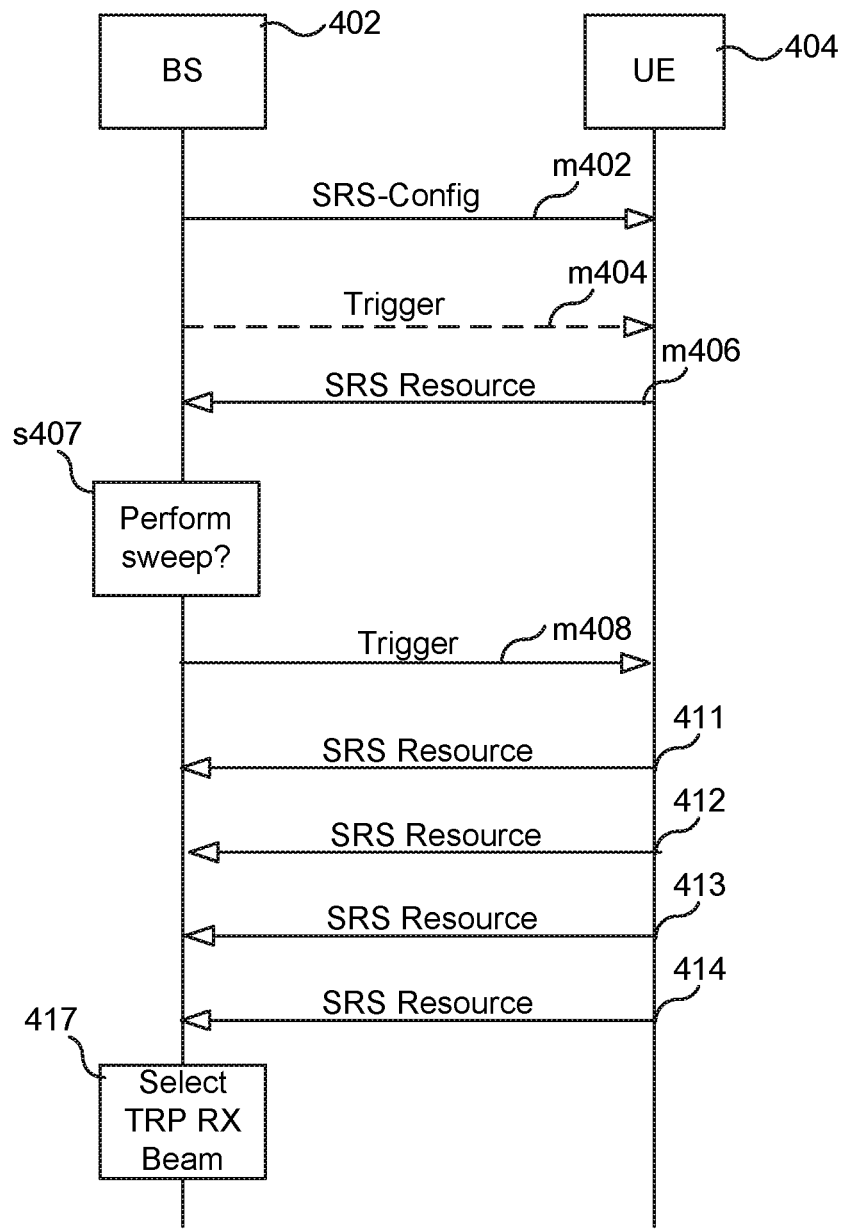
FIG. 4 illustrates an example data flow, according to an embodiment.

FIG. 4 is a message flow diagram illustrating one embodiment of this disclosure. In this embodiment, a base station 402 is serving a UE 404. UE 404 may be any device capable of wireless communicating with base station 402. For example, UE 404 may be a mobile phone, a tablet, a laptop, a sensor (or other internet of things (IoT) device), or any other device with wireless communication capabilities. Base station 402 may be any network entity that is capable of wirelessly communicating with UEs and providing network access to the UEs. For example, in one embodiment base station 102 is a 5G base station (gNB).

Base station 402, in this example, configures UE 404 with: i) a first SRS set with usage 'beamManagment' with a single SRS resource and iii) a second SRS resource set with usage 'beamManagment' with a single SRS resource and with a repetition factor=N. The repetition factor of N allows base station 402 to sweep through N TRP beams per TRP panel (in some embodiments N=4, in other embodiments N=12, in yet other embodiment N is any number greater than 1). If base station 402 decides to evaluate more than N TRP beams per TRP panel, base station 402 can trigger the transmission of the SRS set multiple times, and/or base station 402 can have multiple SRS resource sets that are triggered after each other. For example, as shown in FIG. 4, base station 402 transmits to UE 404 a message m402 that includes an SRS-Config IE which includes the first and second SRS resource sets.

Figure 5A:
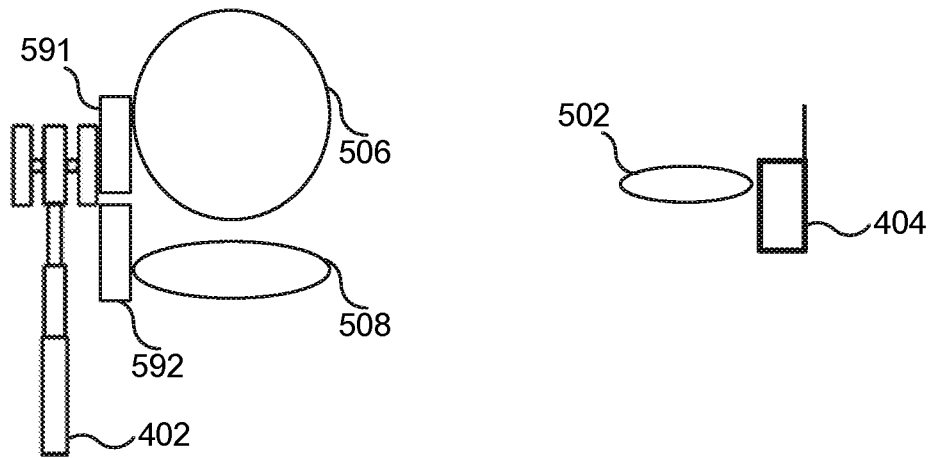
FIGS. 5A-5C illustrate example beam management procedures, according to an embodiment.

Base station 402 then transmits to UE 404 a trigger message m404 (e.g., a DCI that contains an aperiodic SRS-ResourceTrigger or a MAC control element (CE)) that identifies (directly or indirectly) the first SRS resource set and triggers UE 404 to use a UE TX beam 502 (see FIG. 5A) to transmit an SRS m406 in accordance with the SRS resource included in the identified SRS resource set. As shown in FIG. 5A, base station 402 receives the SRS m406 at a first antenna panel 591 using a wide beam 506 and receives the SRS m406 at a second antenna panel 592 using a narrow beam 508. The wide beam 506 can be either the best SSB beam for that UE 404 or a cell-covering beam, and the narrow beam 508 can be a previously determined best narrow beam (e.g., a narrow beam selected as a result of performing a beam sweep such as a U2 beam sweep). Using the best SSB beam as the wide beam 506 can evaluate if UE 404 if there is a better narrow beam within beam 506. Using a cell-covering beam (e.g., an element pattern) can determine if there are any narrow TRP beams in any direction within the coverage of the element pattern that is better than beam 506.

Figure 5B:
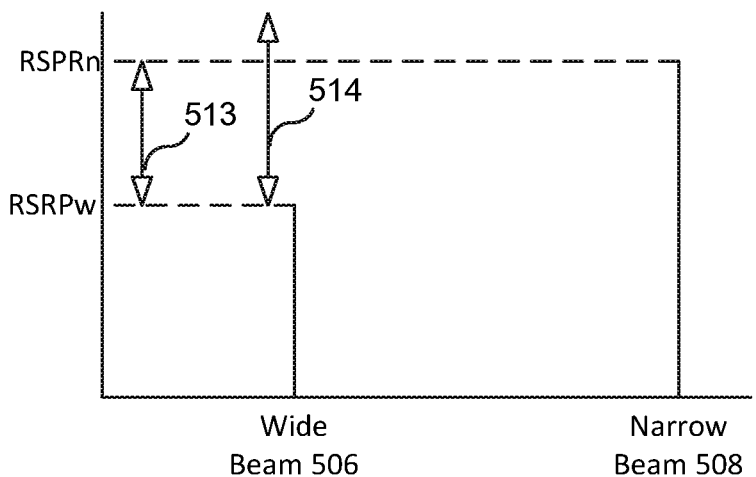

After receiving the SRS using the wide beam 506 and the narrow beam 508, base station 402 determines whether to initiate a U2 beam sweep (see step s407). For example, base station 402 determines whether to initiate a UE beam sweep based on a difference between (1) the RSRP of the received SRS for narrow beam 508 and (2) the RSRP of the received SRS for wide beam 506. More specifically, in this embodiment, as shown in FIG. 5B, base station 402 compares the RSRP of the received SRS for the wide beam 506 (denoted "RSRPw") and the RSRP of the received SRS for the narrow beam 508 (denoted "RSRPn") and determines whether a difference 513 between RSRPn and RSRPw is less than a threshold amount 514. If RSRPn-RSRPw is less than the threshold amount 514, then there is a risk that there exists a narrow beam that would perform better than narrow beam 508 because the threshold 514 is chosen such that it is generally expected that the best narrow beam should outperform the wide beam by at least the threshold 514. Accordingly, base station 402 can decide based on the RSRP measurements whether or not to trigger the SRS resource set with a repetition factor of four to evaluate different candidate TRP beams (i.e., initiate the U2 beam sweep).

If base station 402 determines to initiate the U2 beam sweep, base station 402 sends to UE 404 a trigger message m408 that identifies (directly or indirectly) the second SRS resource set and that triggers UE 404 to transmit an SRS at four different times 411, 412, 413, and 414, as shown in FIG. 4. Base station 402 then, based on measurements of the SRS transmission, selects a TRP RX beam 417.

Figure 5C:
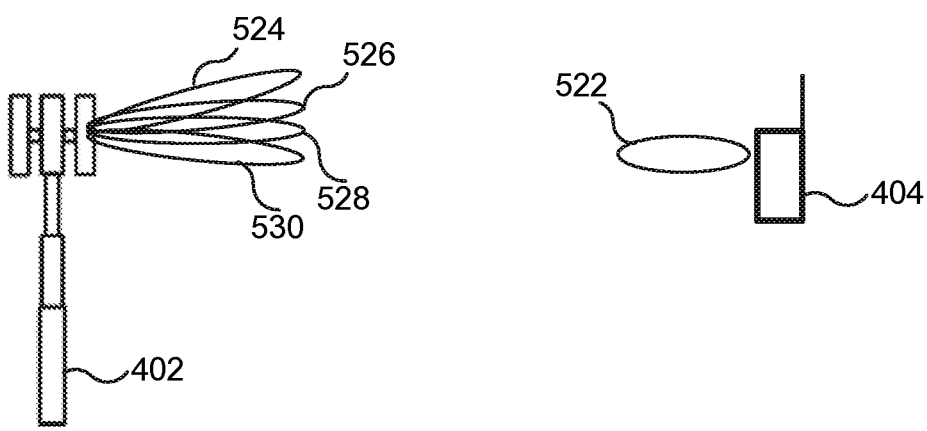

For example, as shown in FIG. 5C, base station 402 sweeps through a set of four TRP RX beams 524-528 such that each one of the beams is used to receive one of the four SRS transmissions triggered by trigger message m408 (as shown in FIG. 5C, UE 404 uses UE TX beam 522 to perform the SRS transmissions). Base station 402 performs an RSRP measurement for each one of the TRP RX beams to identify the TRP RX beam that produces the highest RSRP measurement.

In another embodiment, instead of base station 402 applying the discussed process during a single SRS resource transmission, base station 402 performs the process during a U3 beam sweep. This is illustrated in FIG. 6.

Figure 6:
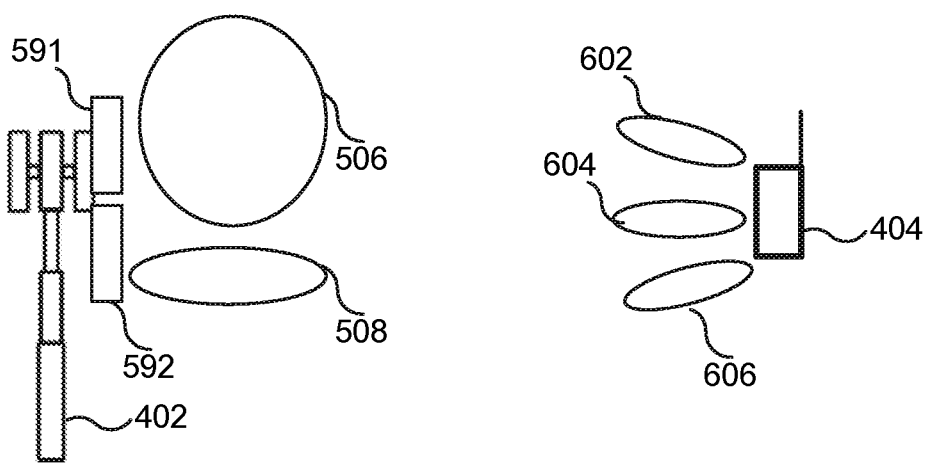
FIG. 6 illustrates example beam management procedures on a base station with two antenna panels, according to an embodiment.

In the example illustrated in FIG. 6, UE 404 first transmits the SRS using beam 602, then transmits the SRS using beam 604, and then transmits the SRS using beam 606. For each one of these three SRS transmission, base station 402 simultaneously receives the transmission using wide beam 506 and narrow beam 508, and, for each beam, determines the RSRP for the SRS transmission. Thus, base station 402 will produce the following three pairs of RSRP measurements: (RSRPw1,RSRPn1), (RSRPw2,RSRPn2), and (RSRPw3,RSRPn3), where RSRPw1 and RSRPn1 are determined based on the first SRS transmission, RSRPw2 and RSRPn2 are determined based on the second SRS transmission, and RSRPw3 and RSRPn3 are determined based on the third SRS transmission. Base station 402 then compares RSRPn1, RSRPn2, and RSRPn3 to determine which is the greatest. If we assume RSRPn1 is greater than RSRPn2 and RSRPn3, then base station 402 computes diff=RSRPn1−RSRPw1. If diff is less than the threshold 514, then base station 402 will initiate the U2 beam sweep.

In another exemplary embodiment, base station 402 uses received data instead of a received SRS to determine the difference in received power between the current best narrow beam (generated on one panel) and the wide beam (generated on a second panel).

Figure 7A:
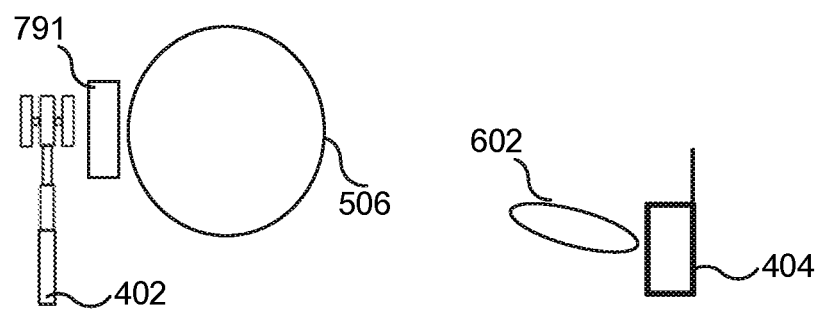
FIG. 7A-7B illustrate example beam management procedures on a base station with one antenna panel, according to an embodiment.
Figure 7B:
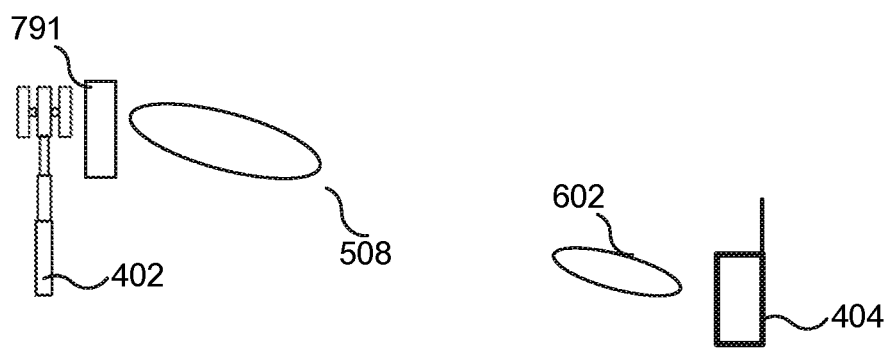

FIGS. 7A and 7B illustrate an embodiment where base station 402 only uses one TRP panel 791 when receiving the SRSs. For example, base station 402 is equipped with only one panel, or base station 402 wants to use the other TRP panels for other tasks. In this embodiment, UE 404 is configured with an SRS resource set with two SRS resources. Alternatively, UE 404 may be configured with an SRS resource set with a single SRS resource having a repetition factor of 2. In either case, as a result of receiving one or more trigger messages transmitted by base station 402 to UE 404, UE 404 transmits, at a first point in time, an SRS and then transmits an SRS at a later, second point in time. The first SRS transmission by UE 404 is received by base station 402 using wide beam 506 (see FIG. 7A), and the second SRS transmission by UE 404 is received by base station 402 using narrow beam 508 (see FIG. 7B). As with the first embodiment, base station 402 then computes diff=RSRPn−RSRPw, where RSPRn is the RSRP of the received SRS for the narrow beam 508, and RSPRw is the RSRP of the received SRS for the wide beam 506. Then, based on whether diff is less than the threshold 514, base station 402 determines whether or not to initiate the U2 sweep.

Determining the Threshold

The threshold can be determined in several different ways. A few, non-limiting examples are described below.

In one example, where UE 404 is in a line-of-sight (LOS) scenario without any angular spread, the narrow beam should have an RSRP that is approximately 10*log 10(numberAntennaElemntsInPanel) larger than the RSRP of the wide beam (assuming base station 402 applies the element pattern of the wide beam and that UE 404 is located in the same direction as the highest gain of the narrow beam). If base station 402 uses untapered DFT beam without oversampling, there is, roughly, a 4 dB gain drop at the cross over between adjacent beams. So in this example, the threshold corresponds to 10*log 10(numberAntennaElemntsInPanel)−4 dB. If the wide beam has less received power than the narrow beam minus the threshold, there is a substantial chance that there exists a better narrow beam, and base station 402 can accordingly initiate a beam sweep.

Figure 8A:
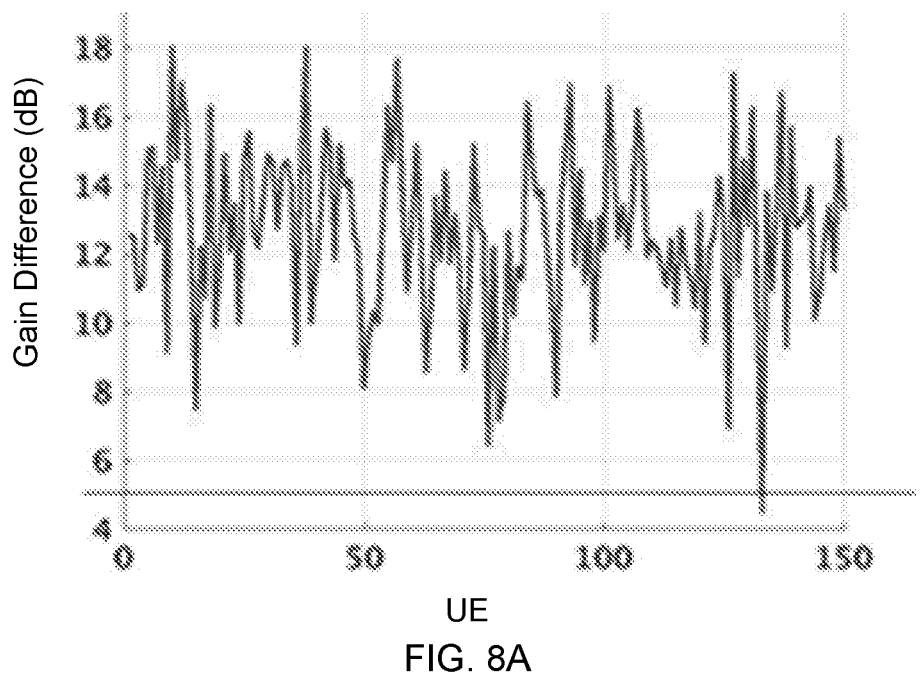
FIGS. 8A-8B illustrate example analysis for determining a threshold value, according to an embodiment.
Figure 8B:
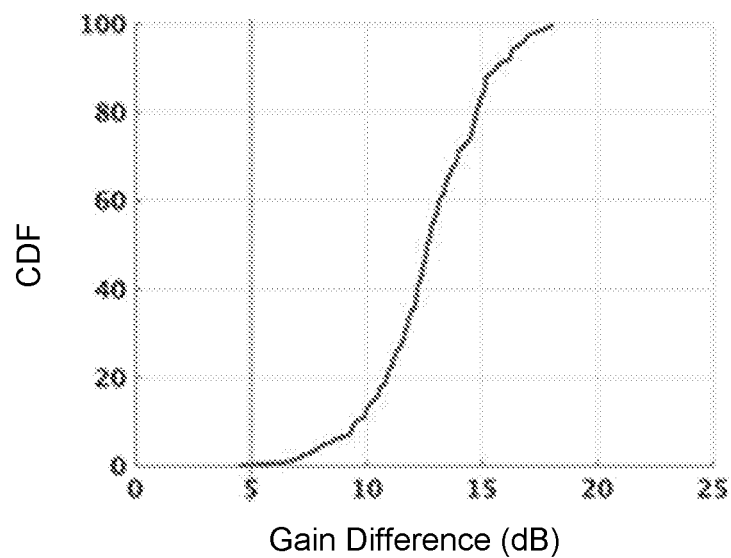

In another example, where there is angular spread at base station 402, the RSRP gains for the narrow beam will be more difficult to predict. FIGS. 8A and 8B show simulations using channel matrices extracted from a dynamic simulator (for UMi scenario). FIGS. 8A and 8B indicate that, for a TRP panel with 4×8 elements, the best narrow beam is at least 5 dB better than the wide beam in almost 100% of all cases. Accordingly, if the threshold is 5 dB and the RSRP of the wide TRP beam+the threshold is larger than the RSPR for the narrow TRP beam, there is a large chance that the narrow TRP is not the best one. Base station 402 can then initiate a U2 beam sweep.

However, the threshold does not need to require an approximately 100% certainty that the narrow beam is not the best. In most situations, there is a large risk that base station 402 is using a sub-optimal narrow TRP beam. The threshold value can balance the overhead required from beam management with an importance of using the best narrow beam. In one embodiment, if the system has a high sensitivity to extra overhead signaling, the threshold is smaller. In another embodiment, if UE 404 has a highly sensitive link budget which corresponds to a high importance for using the best narrow TRP beam, the threshold is larger.

In some examples, the threshold is adjusted adaptively to maximize performance. If the threshold is too small, there may be many transmissions with suboptimal TRP RX beam leading to poor performance. The threshold can then be increased as long as performance increases and the overhead does not become too large. In some examples, machine learning can be used to find the optimal threshold.

Therefore, as indicated above, for UL beam management (or other UL transmissions), the present disclosure provides for using a wide RX beam on one TRP panel of base station 402 and the current best narrow TRP beam on the second panel of base station 402. If the RSRP from the narrow beam minus the received power of the wide beam is smaller than a certain threshold, base station 402 triggers a more advanced UL beam management procedure (i.e., U2), in order to update the TRP beam for UE 404. The threshold is determined based on how sensitive the system is for overhead signaling and how sensitive the link budget is for UE 404.

Figure 9:
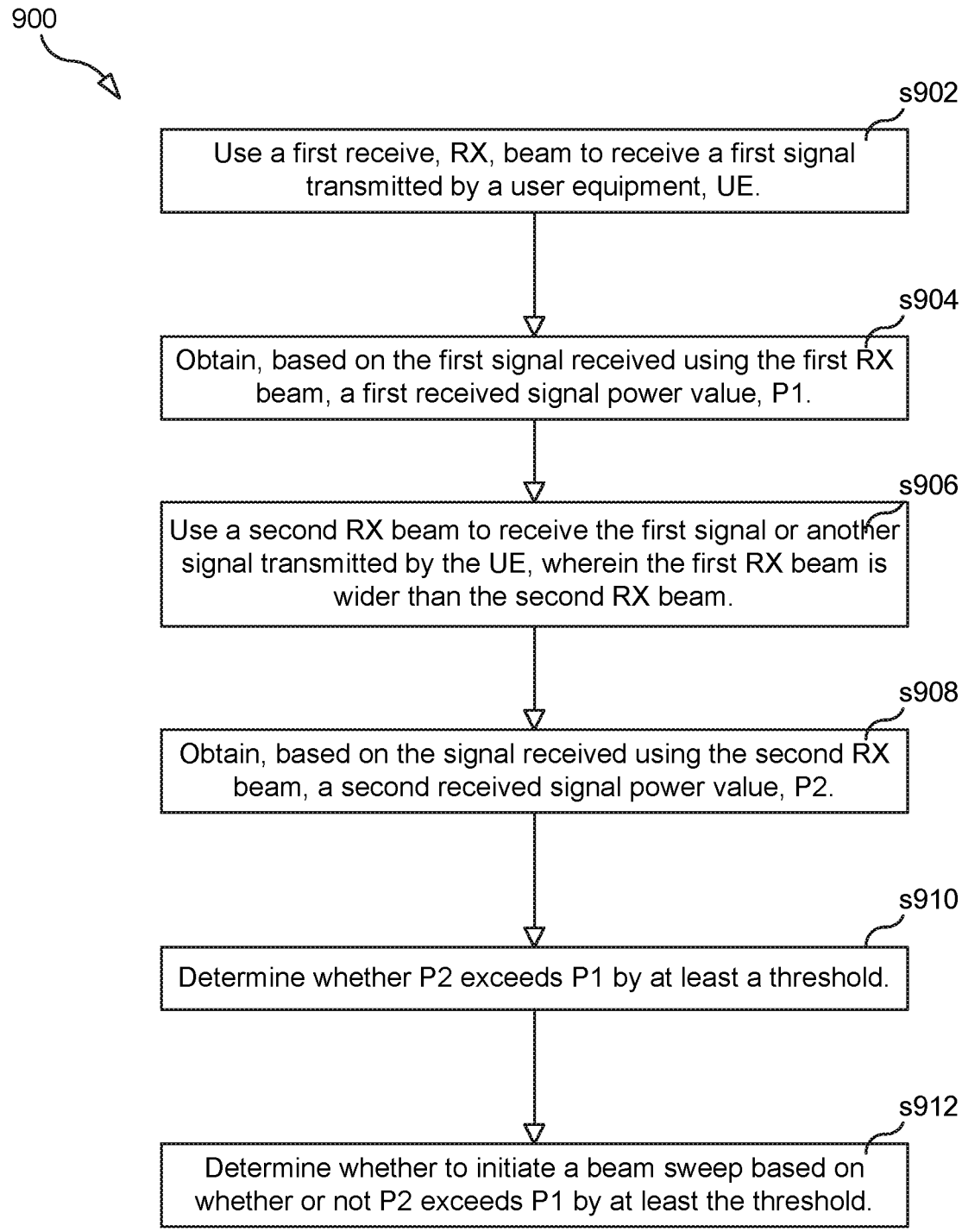
FIG. 9 is a flow chart illustrating a process according to some embodiments.

FIG. 9 is a flowchart illustrating a beam management process 900, according to an embodiment, that is performed by a network node (e.g., base station 404). Process 900 may begin in step s902.

Step s902 comprises the network node using a first RX beam to receive a first signal transmitted by a UE (e.g., UE 404). For example, the first RX beam is wide beam 506 as illustrated in FIG. 5A. For example, the first signal is SRS m406, as discussed with respect to FIG. 4.

Step s904 comprises the network node obtaining, based on the first signal received using the first RX beam, a first received signal power value, P1. For example, P1 is RSRPw as discussed with respect to FIG. 5B.

Step s906 comprises the network node using a second RX beam to receive the first signal or another signal transmitted by the UE, wherein the first RX beam is wider than the second RX beam. For example, the second RX beam is narrow beam 508 as illustrated in FIG. 5B.

Step s908 comprises the network node obtaining, based on the signal received using the second RX beam, a second received signal power value, P2. For example, P2 is RSRPn as discussed with respect to FIG. 5B.

Step s910 comprises determining whether P2 exceeds P1 by at least a threshold. For example, step s910 is performed according to any of the methods of determining the threshold, as discussed above.

Step s912 comprises determining whether to initiate a beam sweep based on whether or not P2 exceeds P1 by at least the threshold. For example, step s912 corresponds to the base station 402 determines whether to initiate a U2 beam sweep 407, as discussed regarding FIG. 4.

In some examples, the process 900 further includes, as a result of determining that P2 does not exceed P1 by at least the threshold, the network node initiating the beam sweep. In some examples, initiating the beam sweep comprises the network node transmitting to the UE a trigger message that is associated with a beam management Sounding Reference Signal, SRS, resource set that identifies an SRS resource and that triggers the UE to transmit a plurality of reference signals in accordance with the SRS resources set.

In some examples, process 900 further includes, for each RX beam included in a set of RX beams, using the RX beam to receive one of the plurality of reference signals and determining a reference signal received power (RSRP) value for the reference signal received using the RX beam, and selecting an RX beam from the set of RX beams based on the determined RSRP values.

In some examples, the first signal is a first reference signal. In some examples, process 900 includes, prior to receiving the first reference signal, transmitting to the UE a first trigger message that triggers the UE to transmit the first reference signal. For example, the trigger message is trigger message m404 as discussed with respect to FIG. 4. For example, the first trigger message that triggers the UE to transmit the first reference signal is associated with a beam management SRS resource set that identifies a single SRS resource.

In some examples of process 900, the network node uses the second RX beam to receive said other signal and said other signal is a second reference signal. In some examples, the method further comprises, prior to receiving the second reference signal, transmitting to the UE a second trigger message that triggers the UE to transmit the second reference signal. For example, the second trigger message is trigger message m408 as discussed with respect to FIG. 4.

In some examples, the second trigger message that triggers the UE to transmit the second reference signal is associated with the beam management SRS resource set that identifies the single SRS resource.

In some examples of process 900, the network node comprises a first antenna panel and a second antenna panel. For example, the first antenna panel is panel 591 of FIG. 5A, and the second antenna panel is panel 592 of FIG. 5A. In this embodiment, using the first RX beam to receive the first signal comprises using the first antenna panel, but not the second antenna panel, to receive the first signal, and using the second RX beam to receive the first signal or the another signal comprises using the second antenna panel, but not the first antenna panel, to receive the first signal.

In some examples, process 900 further includes i) using the first RX beam to receive a second signal transmitted by the UE; ii) obtaining, based on the second signal received using the first RX beam, a third received signal power value, P3; iii) using the second RX beam to receive the second signal transmitted by the UE; iv) obtaining, based on the second signal received using the second RX beam, a fourth received signal power value, P4; and v) determining that P2 is greater than P4. In some examples, the step of determining whether to initiate the beam sweep based on whether or not P2 exceeds P1 by at least the threshold is performed as a result of determining that P2 is greater than P4.

In some examples of process 900, the threshold is based on a link budget sensitivity and/or a current load of the network node.

In some examples of process 900, the threshold is at least 5 dB.

Figure 10:
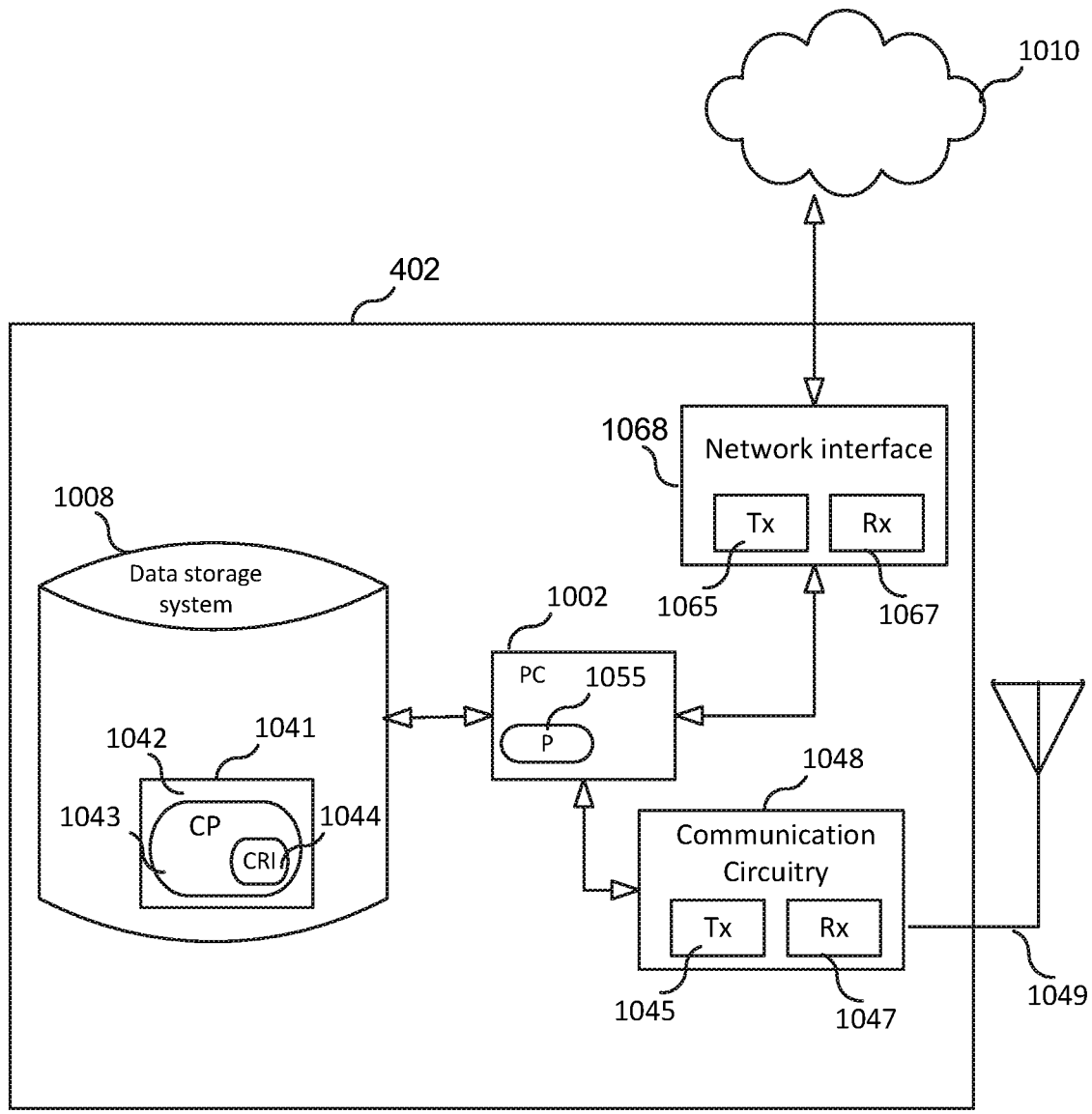
FIG. 10 is a block diagram illustrating a base station, according to an embodiment.

FIG. 10 is a block diagram of the network node 1000 (e.g., base station 402), according to some embodiments. As shown in FIG. 10, network node 1000 may comprise: processing circuitry (PC) 1002, which may include one or more processors (P) 1055 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., network node 1000 may be a distributed computing apparatus); a network interface 1068 comprising a transmitter (Tx) 1065 and a receiver (Rx) 1067 for enabling network node 1000 to transmit data to and receive data from other network nodes connected to a network 1010 (e.g., an Internet Protocol (IP) network) to which network interface 4048 is connected; communication circuitry 4048, which is coupled to an antenna arrangement 4049 comprising one or more antennas and which comprises a transmitter (Tx) 4045 and a receiver (Rx) 4047 for enabling the network node to transmit data and receive data (e.g., wirelessly transmit/receive data); and a local storage unit (a.k.a., "data storage system") 1008, which may include one or more non-volatile storage devices and/or one or more volatile storage devices. In embodiments where PC 1002 includes a programmable processor, a computer program product (CPP) 4041 may be provided. CPP 4041 includes a computer readable medium (CRM) 4042 storing a computer program (CP) 4043 comprising computer readable instructions (CRI) 4044. CRM 4042 may be a non-transitory computer readable medium, such as, magnetic media (e.g., a hard disk), optical media, memory devices (e.g., random access memory, flash memory), and the like. In some embodiments, the CRI 4044 of computer program 4043 is configured such that when executed by PC 1002, the CRI causes the network node to perform steps described herein (e.g., steps described herein with reference to the flow charts). In other embodiments, the network node may be configured to perform steps described herein without the need for code. That is, for example, PC 1002 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for beam management, the method being performed by a network node, the method comprising:
   using a first receive (RX) beam to receive a first signal transmitted by a user equipment (UE);
   obtaining, based on the first signal received using the first RX beam, a first received signal power value (P1);
   using a second RX beam to receive the first signal or another signal transmitted by the UE, wherein the first RX beam is wider than the second RX beam;
   obtaining, based on the signal received using the second RX beam, a second received signal power value (P2);
   determining whether said P2 exceeds said P1 by at least a threshold; and
   determining whether to initiate a beam sweep based on whether or not said P2 exceeds said P1 by at least the threshold.

2. The method of claim 1, further comprising:
   as a result of determining that said P2 does not exceed said P1 by at least the threshold, initiating the beam sweep.

3. The method of claim 2, wherein initiating the beam sweep comprises transmitting to the UE a trigger message that is associated with a beam management Sounding Reference Signal (SRS) resource set that identifies an SRS resource and that triggers the UE to transmit a plurality of reference signals in accordance with the SRS resources set.

4. The method of claim 3, further comprising:
   for each RX beam included in a set of RX beams, using the RX beam to receive one of the plurality of reference signals and determining a reference signal received power (RSRP) value for the reference signal received using the RX beam; and
   selecting an RX beam from the set of RX beams based on the determined RSRP values.

5. The method of claim 1, wherein
   the first signal is a first reference signal, and
   the method further comprises, prior to receiving the first reference signal, transmitting to the UE a first trigger message that triggers the UE to transmit the first reference signal.

6. The method of claim 5, wherein the first trigger message that triggers the UE to transmit the first reference signal is associated with a beam management sounding reference signal (SRS) resource set that identifies a single SRS resource.

7. The method of claim 5, wherein
   the network node uses the second RX beam to receive said other signal;
   said other signal is a second reference signal, and
   the method further comprises, prior to receiving the second reference signal, transmitting to the UE a second trigger message that triggers the UE to transmit the second reference signal.

8. The method of claim 7, wherein the second trigger message that triggers the UE to transmit the second reference signal is associated with the beam management sounding reference signal (SRS) resource set that identifies the single SRS resource.

9. The method of claim 1, wherein
   the network node comprises a first antenna panel and a second antenna panel,
   using the first RX beam to receive the first signal comprises using the first antenna panel, but not the second antenna panel, to receive the first signal, and
   using the second RX beam to receive the first signal or the another signal comprises using the second antenna panel, but not the first antenna panel, to receive the first signal.

10. The method of claim 1, further comprising:
    using the first RX beam to receive a second signal transmitted by the UE;
    obtaining, based on the second signal received using the first RX beam, a third received signal power value (P3);
    using the second RX beam to receive the second signal transmitted by the UE;
    obtaining, based on the second signal received using the second RX beam, a fourth received signal power value (P4); and
    determining that said P2 is greater than said P4, wherein the step of determining whether to initiate the beam sweep based on whether or not said P2 exceeds said P1 by at least the threshold is performed as a result of determining that said P2 is greater than said P4.

11. The method of claim 1, wherein the threshold is based on a link budget sensitivity and/or a current load of the network node.

12. The method of claim 1, wherein the threshold is at least 5 dB.

13. A non-transitory computer readable storage medium storing a computer program comprising instructions which when executed by processing circuitry causes the processing circuitry to perform the method of claim 1.

14. A network node, comprising:
    processing circuitry; and
    a data storage system, said data storage system storing instructions executable by said processing circuitry, wherein said network node is configured to perform a method comprising:
    using a first receive (RX) beam to receive a first signal transmitted by a user equipment (UE);
    obtaining, based on the first signal received using the first RX beam, a first received signal power value (P1);
    using a second RX beam to receive the first signal or another signal transmitted by the UE, wherein the first RX beam is wider than the second RX beam;
    obtaining, based on the signal received using the second RX beam, a second received signal power value (P2);
    determining whether said P2 exceeds said P1 by at least a threshold; and
    determining whether to initiate a beam sweep based on whether or not said P2 exceeds said P1 by at least the threshold.

15. The network node of claim 14, wherein the method further comprises:
    as a result of determining that said P2 does not exceed said P1 by at least the threshold, initiating the beam sweep.

16. The network node of claim 15, wherein initiating the beam sweep comprises transmitting to the UE a trigger message that is associated with a beam management Sounding Reference Signal (SRS) resource set that identifies an SRS resource and that triggers the UE to transmit a plurality of reference signals in accordance with the SRS resources set.

17. The network node of claim 16, wherein the method further comprises:
    for each RX beam included in a set of RX beams, using the RX beam to receive one of the plurality of reference signals and determining a reference signal received power (RSRP) value for the reference signal received using the RX beam; and selecting an RX beam from the set of RX beams based on the determined RSRP values.

18. The network node of claim 14, wherein
the first signal is a first reference signal, and
the method further comprises, prior to receiving the first reference signal, transmitting to the UE a first trigger message that triggers the UE to transmit the first reference signal.

19. The network node of claim 18, wherein the first trigger message that triggers the UE to transmit the first reference signal is associated with a beam management sounding reference signal (SRS) resource set that identifies a single SRS resource.

20. The network node of claim 18, wherein
the network node uses the second RX beam to receive said other signal;
said other signal is a second reference signal, and
the method further comprises, prior to receiving the second reference signal, transmitting to the UE a second trigger message that triggers the UE to transmit the second reference signal.

* * * * *